United States Patent
Natarajan et al.

(10) Patent No.: US 7,136,931 B2
(45) Date of Patent: Nov. 14, 2006

(54) METHOD AND SYSTEM FOR IDENTIFYING THE HEALTH OF VIRTUAL ROUTERS

(75) Inventors: Srikanth Natarajan, Ft. Collins, CO (US); Richard David Lamb, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

(21) Appl. No.: 10/687,663

(22) Filed: Oct. 20, 2003

(65) Prior Publication Data

US 2005/0083855 A1    Apr. 21, 2005

(51) Int. Cl.
    *G06F 15/173* (2006.01)
(52) U.S. Cl. .......................... 709/238; 700/9; 709/223; 709/249; 370/254
(58) Field of Classification Search ................ 370/219, 370/254; 700/3, 9; 709/223, 238, 249
    See application file for complete search history.

(56) References Cited

U.S. PATENT DOCUMENTS

| | | | | |
|---|---|---|---|---|
| 5,473,599 A | * | 12/1995 | Li et al. ...................... | 370/219 |
| 5,854,899 A | * | 12/1998 | Callon et al. ............... | 709/238 |
| 6,047,330 A | * | 4/2000 | Stracke, Jr. ................. | 709/238 |

\* cited by examiner

*Primary Examiner*—Leo Picard
*Assistant Examiner*—Sheela S. Rao

(57) ABSTRACT

A method and system for identifying active and standby states of plural routers within a virtual router in a network is provided. The health of a virtual router represents whether the routers of the virtual router are configured for their appropriate active and standby states. For example, first information from a first and second router of a virtual router is obtained. The first information is used to determine the active and standby states within the virtual router. A topology of the network is produced identifying the active and standby states.

36 Claims, 7 Drawing Sheets

METHOD AND SYSTEM FOR IDENTIFYING THE HEALTH OF VIRTUAL ROUTERS

BACKGROUND

Computer networks, such as Local Area Networks (LANs) and Metropolitan Area Networks (MANs) can be complex to operate. Corporations use network management software applications to maintain computer networks. The network management software applications can display the network topology and indicate any failures in the computer network. An example of a network management software application, is the Hewlett-Packard OpenView Network Node Manager (NNM) product.

To reduce network disruption due to router failure, some networks employ virtual routers, which are also known as virtual router groups. Virtual routers typically comprise two or more routers which share the same IP address. One of the routers of the virtual router is designated as the active router while one of the other routers of the virtual router is designated as a standby router. The active router forwards all packets for the virtual router. The standby router of the virtual router is only employed for routing functions for the virtual router when the active router switches from the active state, e.g., the active router fails. Since a virtual router employs a single IP address, the process of switching one router from the active state to an inactive state and another router into the active state is transparent to end users.

SUMMARY

A system and method are provided for identifying the health of virtual routers in a network. An exemplary method includes obtaining first information from a first and second router of a virtual router. The first information is used to determine the health of the virtual router. A topology of the network is produced identifying the health of the virtual router. An exemplary machine readable medium includes software for causing a computing device to perform the exemplary method.

A method for identifying the health of virtual routers in a network is provided. First information is obtained from a first and second router in the network. Based on the first information it is determined whether the first and second routers comprise a virtual router. The first information is used to determine the health of the virtual router if the first and second routers comprise a virtual router. A topology of the network identifying the health of the virtual router is produced. An exemplary machine readable medium includes software for causing a computing device to perform the exemplary method.

A management computer for identifying the health of virtual routers in a network is provided. The management computer comprises a processor configured to obtain first information from a first and second router of a virtual router, and to use the first information to determine the health of the virtual router. The management computer also comprises a memory which stores the first information to produce a topology of the network identifying the health of the virtual router.

A management computer for identifying the health of virtual routers in a network is provided. The management computer comprises a processor configured to obtain first information from a first and second router in the network, to determine, based on the first information, whether the first and second routers comprise a virtual router, to use the first information to determine the health of the virtual router if the first and second routers comprise a virtual router. The management computer also comprises a memory which stores the first information to produce a topology of the network identifying the health of the virtual router.

A management computer for identifying the health of virtual routers in a network is provided. The management computer comprises means for processing to obtain first information from a first and second router of a virtual router, and to use the first information to determine the health of the virtual router. The management computer also comprises means for storing the first information to produce a topology of the network identifying the health of the virtual router.

A management computer for identifying the health of virtual routers in a network is provided. The management computer comprises means for processing to obtain first information from a first and second router in the network, to determine, based on the first information, whether the first and second routers comprise a virtual router, to use the first information to determine the health of the virtual router if the first and second routers comprise a virtual router. The management computer also comprises means for storing the first information to produce a topology of the network identifying the health of the virtual router.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION

Figure 1:
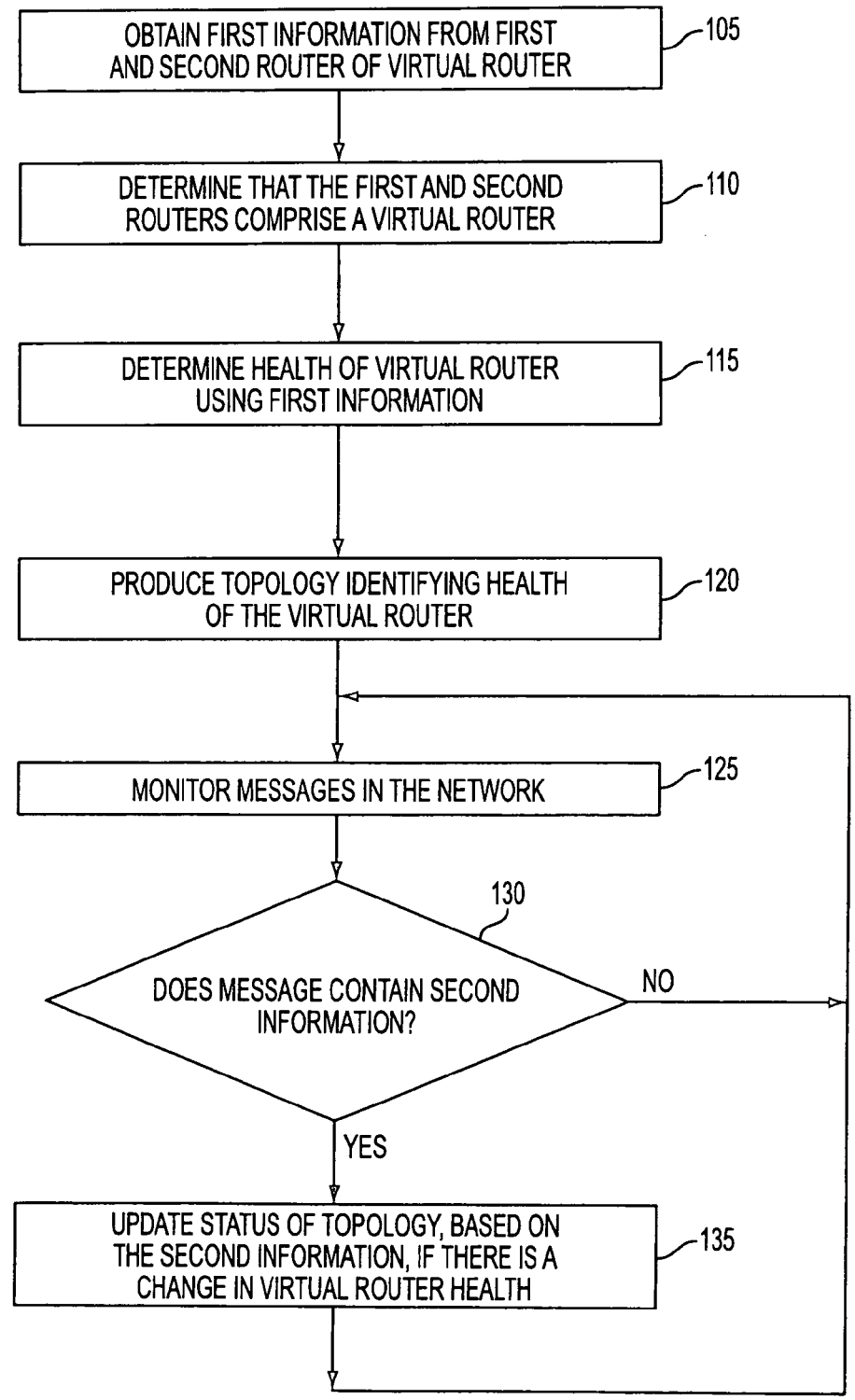
FIG. 1 is a flowchart illustrating a method for identifying the health of virtual routers.

FIG. 1 is a flowchart illustrating a method for identifying the health of virtual routers in a network. As referenced herein, the health of a virtual router represents whether the routers of the virtual router are configured for their appropriate active and standby states based on each router's priority. In step 105, first information is obtained from first and second routers of a virtual router. The first information can include the IP address for the virtual router, the group number for the virtual router, the group priority for the router of the virtual router, the group standby state for the router of the virtual router and the actual IP address for the router of the virtual router. The group number along with the ifIndex of a particular interface uniquely identifies of which virtual router the router is a member. The group priority is used to identify which router is the active router of the virtual router. The group standby state indicates whether the router is the active router of the virtual router. The first information can be obtained by sending one or more queries to the virtual router.

Virtual routers can operate in accordance with a number of different protocols which can be generically referred to as virtual swappable router protocols. In accordance with exemplary embodiments, the virtual routers operate in accordance with Cisco Systems Inc. Hot Standby Router Protocol (HSRP). If the virtual router supports the extended HSRP, then the first information can also include the interface tracked priority of the virtual router and indices to identify the ifIndex of the configured interface, the ifIndex of the tracked interface and the virtual router group number.

Using the first information, in step 110 it is determined that the first and second routers comprise a virtual router, for example by comparing the IP address of the virtual router in the first information received from the first and second routers. In step 115, the health of the virtual router is determined using the first information by determining whether the first information indicates that the routers of the virtual router are configured for their appropriate active and standby states based on each router's priority. In step 120, a topology identifying the health of the virtual router is produced, for example on a display. When information is obtained regarding a plurality of virtual routers, the display of the topology will identify the health of each of the plurality of virtual routers.

Once the display of the topology identifying the health of the virtual routers has been produced, messages in the network are monitored in step 125. In step 130, it is determined whether one of the monitored messages contains second information. The second information can be from trap flows from the virtual router indicating which router of the virtual router is in an active state. If one of the monitored messages does not contain second information, then in accordance with the "No" path out of decision step 130, messages in the network are monitored in step 125.

If the monitored messages contain second information, in accordance with the "Yes" path out of decision step 130, then the second information is compared to the information in the produced topology, to determine whether the health of the virtual router has changed. For example, if the second information indicates that a second router of the virtual router is in an active state while the information in the produced topology indicates that a first router of the virtual router is in an active state, then it is determined from these state indications that the health of the virtual router has changed. If the health of the virtual router has changed, then in step 135 the status of the topology is updated based on the second information to identify the change in health of the virtual router. As indicated by the return path from step 135 to step 125, the system will continue to monitor the network for messages and update the topology as needed.

The following is exemplary pseudo code for performing the method described above in connection with FIG. 1 in a network which operates using HSRP:

```
For all devices{
    Get devicename
    Get HSRP STATE list
    If (HSRP STATE list != NULL) { device is not configured for HSRP
        Get HSRP VIRTUAL IP ADDRESS list
        Get IP ADDR list
        Get HSRP GRP PRIORITY list
        Get HSRP TRACKED PRIORITY list
        While (HSRP STATE list not NULL){
            get cHsrpGrpStandbyState from HSRP STATE list
            if (cHsrpGrpStandbyState == active or standby or speak or listen){
                get ifindex from HSRP STATE list
                get cHsrpGrpVirtualIpAddr from HSRP VIRTUAL IP ADDRESS list using
                    ifindex
                get ipAdEntAddr from IP ADDR list using ifindex
                get cHsrpGrpPriority and hsrpgrpnum from HSRP GRP PRIORITY list using
                    ifindex (hsrpgrpnum is part of the index in response)
                while (HSRP TRACKED PRIORITY list is not NULL) {
                    get cHsrpExtIfTrackedPriority and trackindex from HSRP
                        TRACKED PRIORITY list using ifindex (trackindex is
                        part of the index in response)
                    accumulate multiple entries for cHsrpExtIfTrackedPriorityand
                        trackindex in trackall
                    get next entry on list (HSRP TRACKED PRIORITY)
                }
            }
            output (devicename, cHsrpGrpStandbyState, ifindex, cHsrpGrpVirtualIpAddr,
                ipAdEntAddr, cHsrpGrpPriority, hsprgrpnum, trackall)
            get next entry on (HSRP STATE list)
        }
    }
}endFor
``` where Cisco HSRP MIBs are as follows:

```
HSRP GRP PRIORITY list=
    cisco.ciscoMgmt.ciscoHsrpMIB.ciscoHsrpMIBObjects.cHsrpGroup.cHsrpGrpTable.cHsrpGrpEntry.c
HsrpGrpPriority;
HSRP VIRTUAL IP ADDRESS list=
    cisco.ciscoMgmt.ciscoHsrpMIB.ciscoHsrpMIBObjects.cHsrpGroup.cHsrpGrpTable.cHsrpGrpEntry.c
HsrpGrpVirtualIpAddr;
HSRP STATE list=
    cisco.ciscoMgmt.ciscoHsrpMIB.ciscoHsrpMIBObjects.cHsrpGroup.cHsrpGrpTable.cHsrpGrpEntry.c
HsrpGrpStandbyState;
```

-continued where the Cisco HSRP extended MIB is as follows:
HSRP TRACKED PRIORITY list=
 cisco.ciscoMgmt.ciscoHsrpExtMIB.ciscoHsrpExtMIBObjects.cHsrpExtGroup.cHsrpExtIfTrackedTable.
cHsrpExtIfTrackedEntry.cHsrpExtIfTrackedPriority;

and where the IP ADDR MIB is as follows:

IP ADDR list=ip.ipAddrTable.ipAddrEntry.ipAdEntAddr.

As illustrated in the pseudo code above, for each router which supports HSRP the HSRP STATE list, the HSRP VIRTUAL IP ADDRESS list, the UP ADDR list, the HSRP GRP PRIORITY list and the HSRP TRACKED PRIORITY list is obtained. From this information the cHsrpGrpStandbyState, ifIndex, cHsrpGrpVirtualIpAddr, ipAdEntAddr, cHsrpGrpPriority and hsrpgrpnum are obtained. If the router supports extended HSRP, then the cHsrpExtIfTrackedPriority and trackindex are obtained.

This pseudo code describes the building of the virtual objects for each HSRP group.

```
For each record of saved output {
    if ( virtualhsrpobject for cHsrpGrpVirtualIpAddr is NULL) {
        create virtualhsrpobject with key cHsrpGrpVirtualIpAddr
    }
    if (this vector of information doesn't exist in the group) {
        add this member to virtualhsrpobject with values(ipAdEntAddr,
            cHsrpGrpPriority, cHsrpGrpStandbyState,
            hsrpgrpnum, trackall)
    }
}
```

Figure 2A:
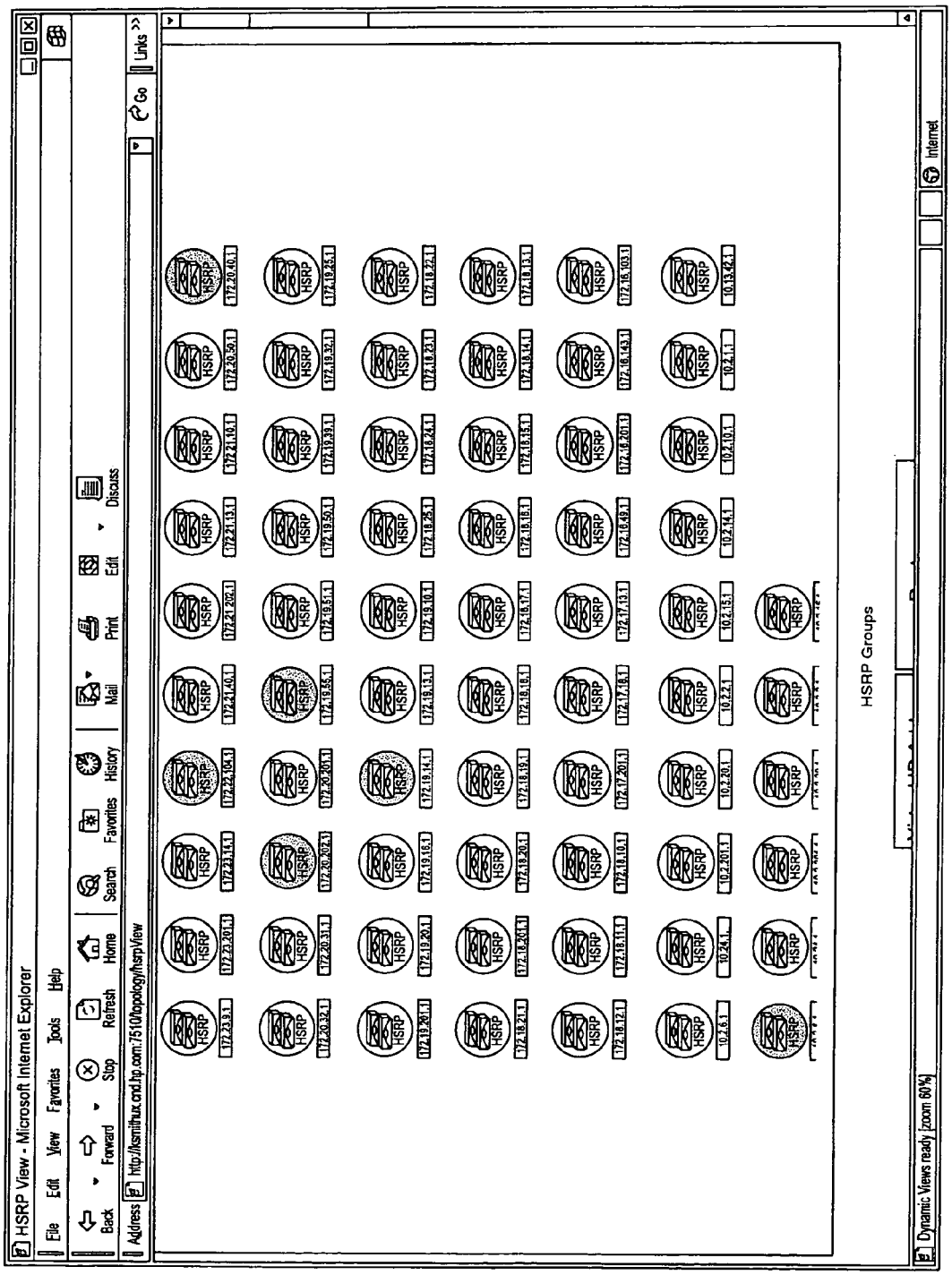
FIGS. 2A–2E are diagrams of an exemplary computer network display.
Figure 2B:
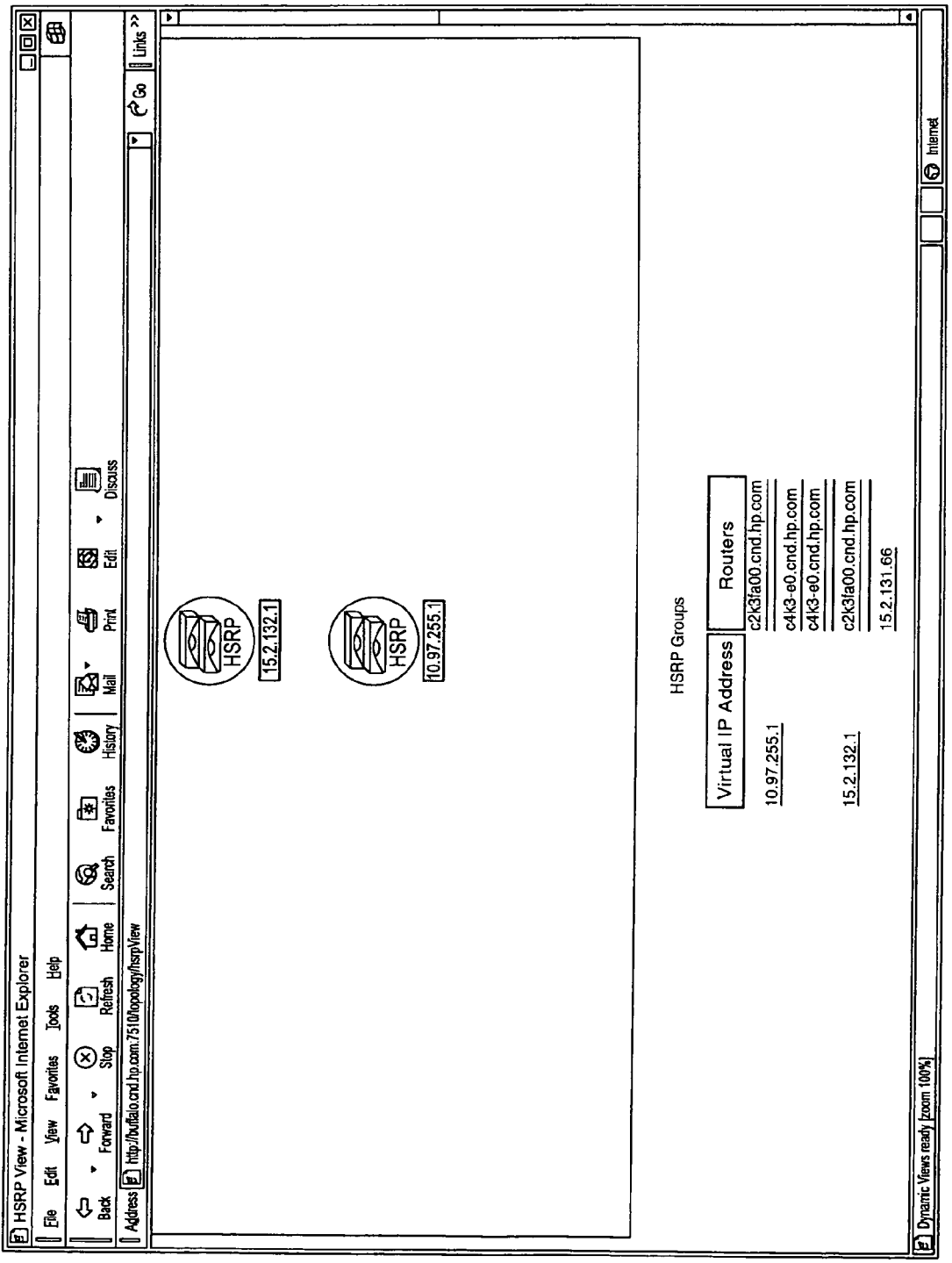
Figure 2C:
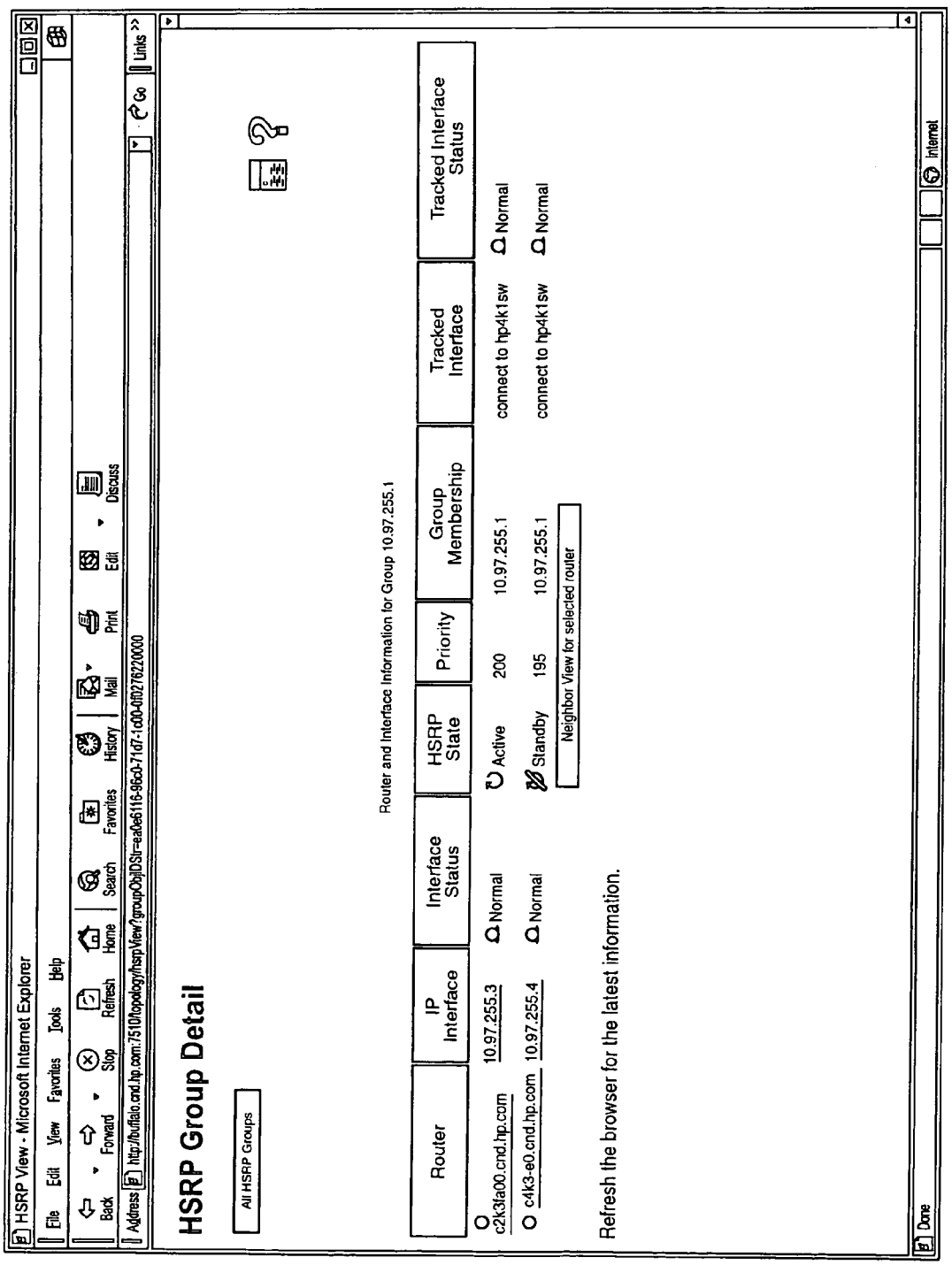
Figure 2D:
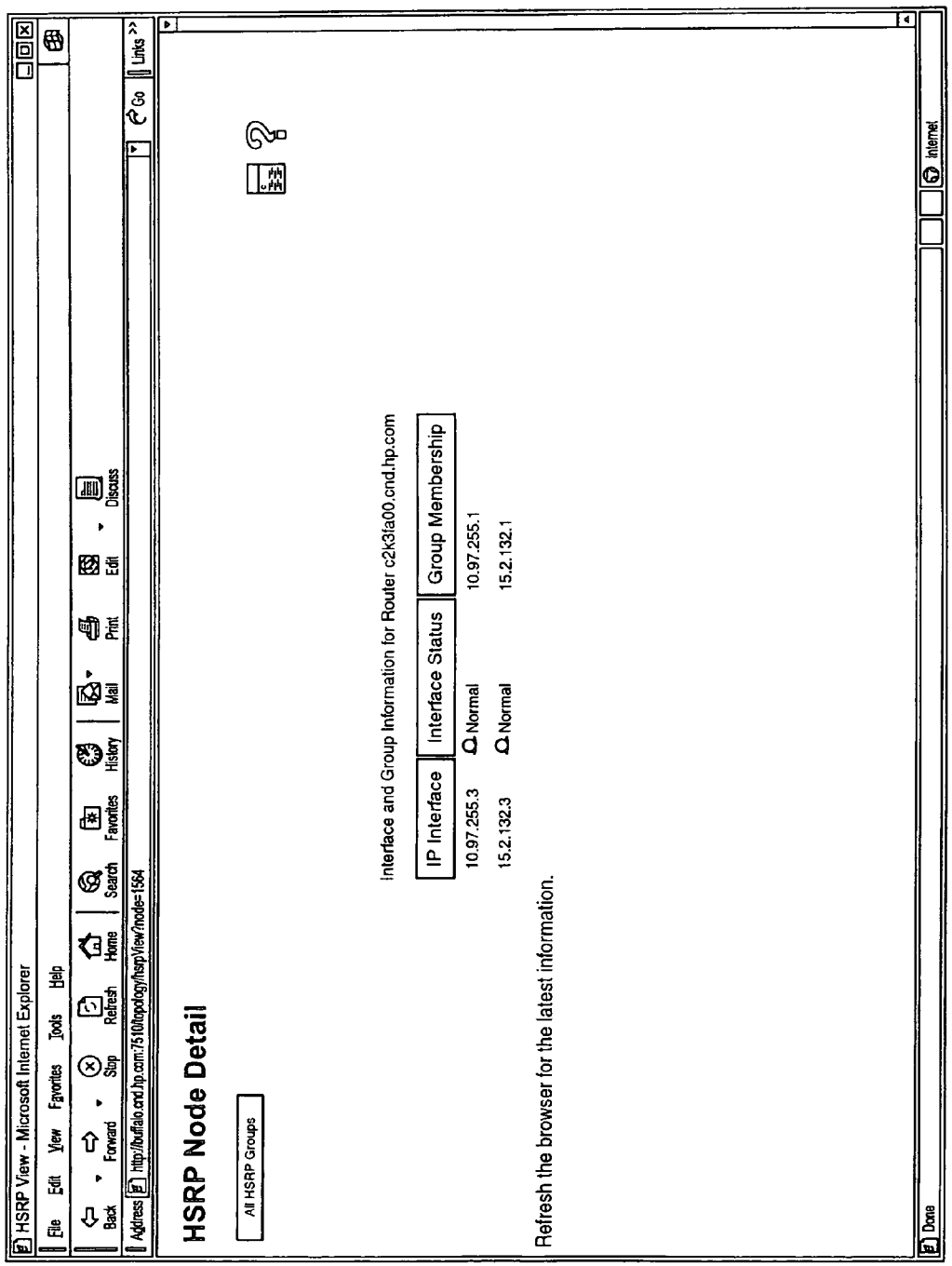
Figure 2E:
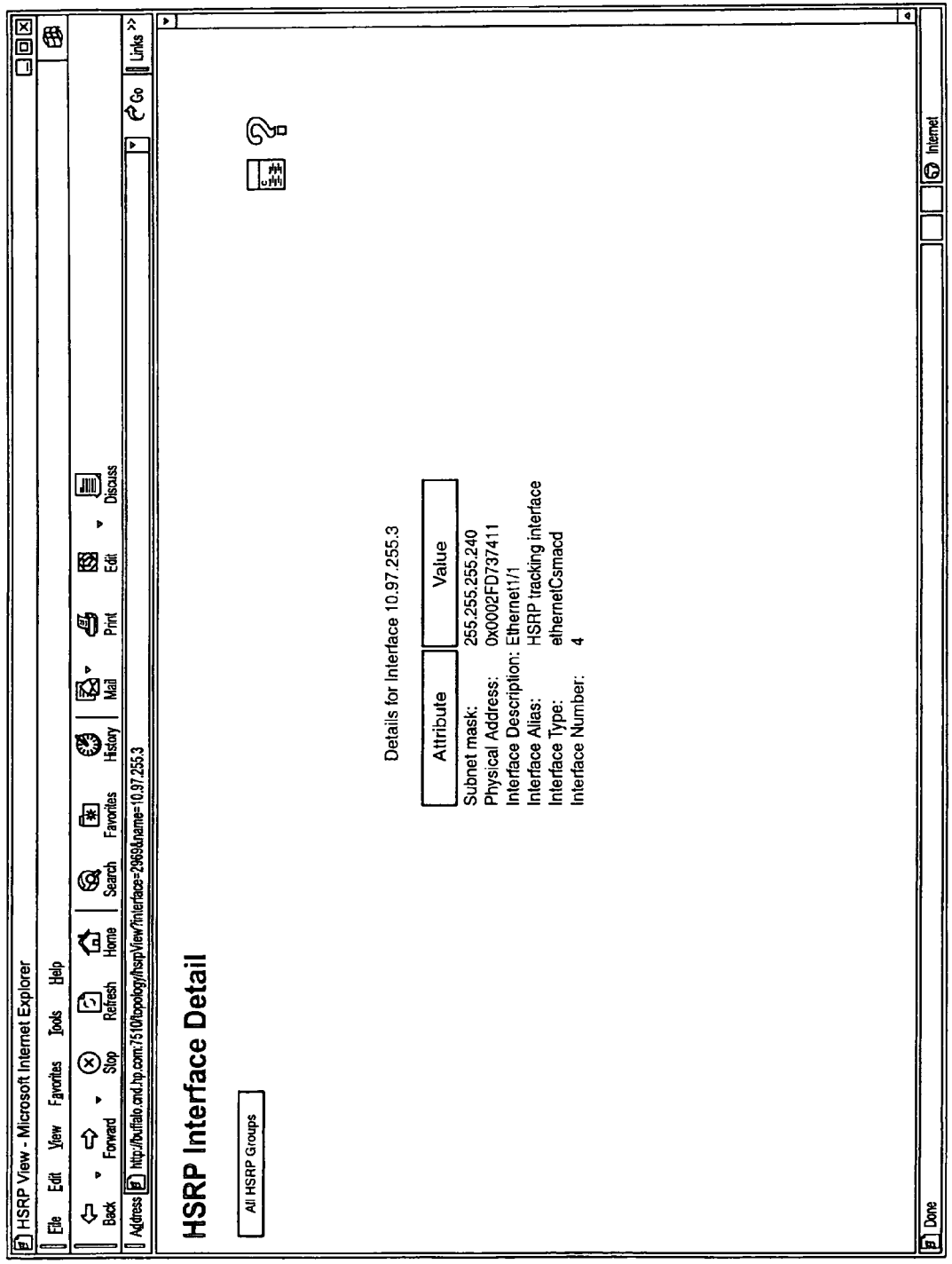

FIGS. 2A and 2B illustrate an exemplary topology produced by the method described above in FIG. 1. In FIG. 2A, a large number of virtual routers are illustrated, and those with the darker colored circles indicate virtual routers which have poor health, i.e., where at least one of the routers of the virtual router has failed, whereas the lighter shaded virtual routers indicate that the virtual routers are in good health, i.e., where all of the routers of the virtual router are configured for their appropriate active or standby states based on each router's priority. For ease of explanation, FIG. 2B illustrates the entire topology screen with only two virtual routers. If the virtual IP address in FIG. 2B is selected, for example by double clicking, the group detail screen illustrated in FIG. 2C is produced. This group detail screen provides data on all of the routers which comprise a particular virtual router. Selecting a router name in the router column of FIG. 2C produces the node detail screen illustrated in FIG. 2D. Selecting the IP address in the IP interface column in the group detail screen of FIG. 2C, produces the interface detail screen illustrated in FIG. 2E.

Various aspects will now be described in connection with exemplary embodiments in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both. Moreover, the exemplary embodiments can be considered part of any form of computer readable storage medium having stored therein an appropriate set of computer instructions that would cause a processor to carry out the techniques described herein.

Figure 3:
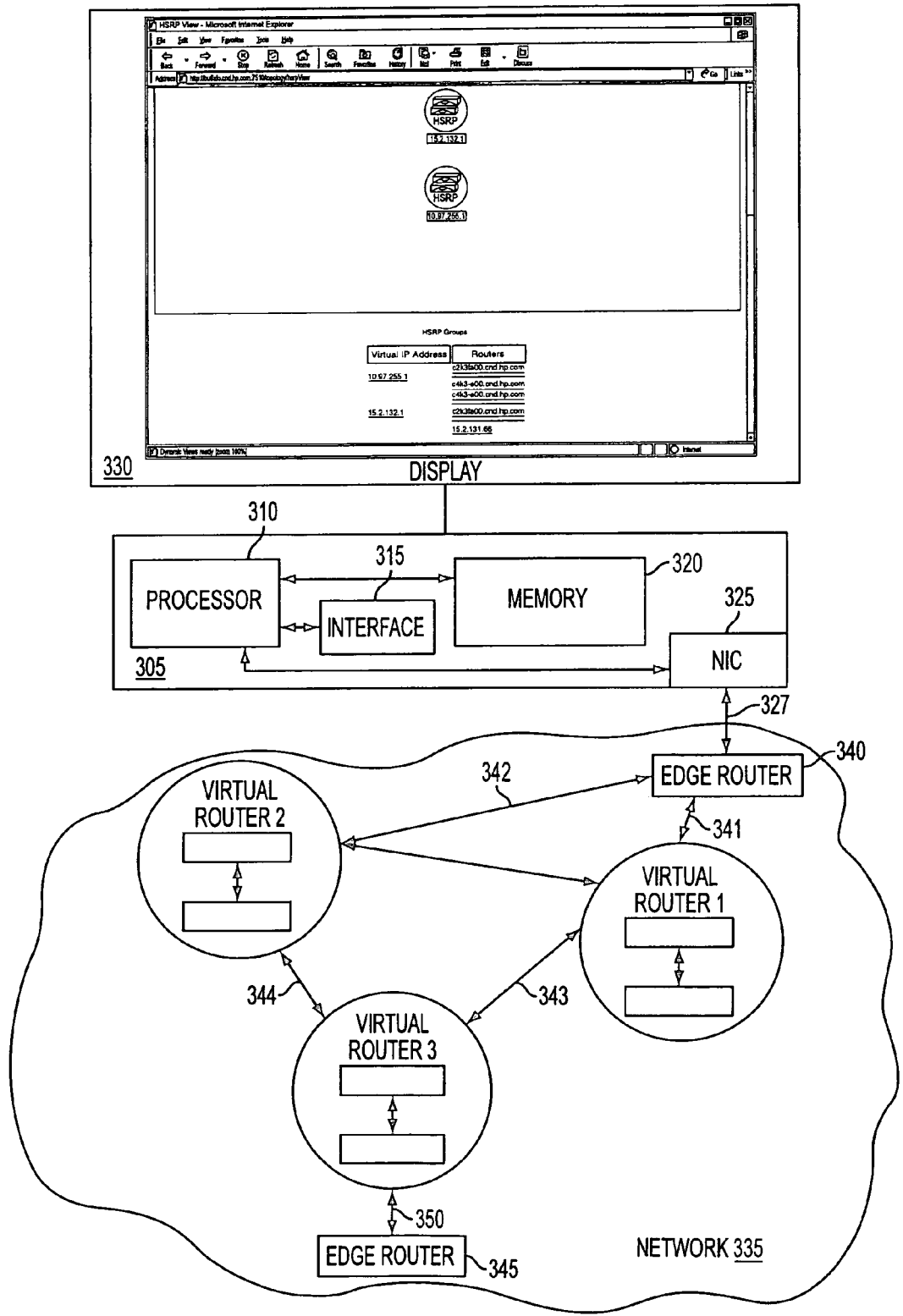
FIG. 3 is a diagram of an exemplary computer implementation and network.

FIG. 3 illustrates an exemplary computer implementation and network. The computer implementation can include a management computer 305 which comprises a means for processing, for example a processor 310. The management computer also comprises an interface 315, means for storing, for example a memory 320, and a network interface card 325. The management computer can also include a display 330. The processor 310 is configured to obtain first information from a first and second router of a virtual router group, and use the first information to determine the health of the virtual router. A topology of the network identifying the health of the virtual router can be produced by display 330. Alternatively, the topology can be produced by attaching a printer, or other output device, to interface 315. Additionally, memory 320 stores the first information to produce the topology.

The management computer 305 can be connected to monitor network 335. Specifically, the management computer 305 can be connected via the network interface card 325 to an edge router 340 of network 335 via communication link 327. The edge router 340 can be connected to one or more virtual routers, for example, virtual router 1 and virtual router 2 via communication links 341 and 342. Virtual routers 1 and 2 can also be connected to other virtual routers, such as, virtual router 3 via communication links 343 and 344. Virtual router 3 can be connected to an edge router 345 via communication link 350. Virtual routers 1–3 each comprise at least an active router and a standby router. Although not illustrated in FIG. 3, the edge router can be connected to additional virtual routers, and the network can contain conventional routers which are not paired with other routers to form a virtual router.

Those skilled in the art will appreciate that software, including instructions for causing a computing device or system to perform the methods or processes described herein, can be stored on a machine-readable medium. For example, the software can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for a network management system to identify active and standby states of plural routers within a virtual router in a network comprising:
    obtaining first information from a first router and a second router of a virtual router, the first information comprising group priority information and group standby state information;
    using the first information to determine the active and standby states within the virtual router, the standby state designating a redundant router; and
    producing a topology of the network identifying the active and standby states to display the health of the virtual router at the network management system based on the obtained first information.

2. The method of claim 1, comprising:
    monitoring messages in the network;
    using second information from the messages to determine whether there are changes to the health of the virtual router; and
    updating, if there are changes in the health of the virtual router, the topology to reflect the changes in the health of the virtual router.

3. The method of claim 1, comprising:
    obtaining the first information from a router of a plurality of virtual routers, wherein the topology identifies the health of the plurality of virtual routers.

4. The method of claim 1, wherein the first information is group priority information and group standby state information for each of the first and second routers.

5. The method of claim 1, wherein the first and second routers operate according to a virtual swappable router protocol.

6. A method for a network management system to identify active and standby states of plural routers within a virtual router in a network comprising:
    obtaining first information from a first router and a second router in the network, the first information comprising group priority information and group standby state information;
    determining, based on the first information, whether the first and second routers comprise a virtual router;
    using the first information to determine the active and standby states within the virtual router if the first and second routers comprise a virtual router, the standby state designating a redundant router; and
    producing a topology of the network identifying the active and standby states to display the health of the virtual router at the network management system based on the obtained first information.

7. The method of claim 6, comprising:
    monitoring messages in the network;
    using second information from the messages to determine whether there are changes to the health of the virtual router; and
    updating, if there are changes in the health of the virtual router, the topology to reflect the changes in the health of the virtual router.

8. The method of claim 6, wherein the first information is group priority information and group standby state information for each of the first and second routers.

9. The method of claim 6, wherein the first and second routers operate according to a virtual swappable router protocol.

10. A management computer for identifying active and standby states of plural routers within a virtual router in a network comprising:
    a processor configured to obtain first information from a first router and a second router of a virtual router, and to use the first information to determine the active and standby states within the virtual router, the standby state designating a redundant router, the first information comprising group priority information and group standby state information; and
    a memory which stores the first information to produce a topology of the network identifying the active and standby states and display the health of the virtual router at the management computer based on the obtained first information.

11. The management computer of claim 10, wherein the processor is configured to monitor messages in the network, use second information from the messages to determine whether there are changes to the health of the virtual router, and update, if there are changes in the health of the virtual router, the topology to reflect the changes in the health of the virtual router.

12. The management computer of claim 10, wherein the processor is configured to obtain the first information from a router of a plurality of virtual routers, wherein the topology identifies the health of the plurality of virtual routers.

13. The management computer of claim 10, wherein the first information is group priority information and group standby state information for each of the first and second routers.

14. The management computer of claim 10, wherein the first and second routers operate according to a virtual swappable router protocol.

15. A management computer for identifying active and standby states of plural routers within a virtual router in a network comprising:
    a processor configured to obtain first information from a first router and a second router in the network, to determine, based on the first information, whether the first and second routers comprise a virtual router, to use the first information to determine the active and standby states within the virtual router if the first and second routers comprise a virtual router, the standby state designating a redundant router, the first information comprising group priority information and group standby state information; and
    a memory which stores the first information to produce a topology of the network identifying the active and standby states and display the health of the virtual router at the management computer based on the obtained first information.

16. The management computer of claim 15, wherein the processor is configured to monitor messages in the network, to use second information from the messages to determine whether there are changes to the health of the virtual router, and to update, if there are changes in the health of the virtual router, the topology to reflect the changes in the health of the virtual router.

17. The management computer of claim 15, wherein the first information is group priority information and group standby state information for each of the first and second routers.

18. The management computer of claim 15, wherein the first and second routers operate according to a virtual swappable router protocol.

19. A computer readable medium containing a computer program for performing a method for a network management system to identify active and standby states of plural routers within a virtual router in a network, the method comprising:

obtaining first information from a first router and a second router of a virtual router, the first information comprising group priority information and group standby state information;

using the first information to determine active and standby states within the virtual router, the standby state designating a redundant router; and producing a topology of the network identifying the active and standby states to display the health of the virtual router at the network management system based on the obtained first information.

20. The method of claim 19, comprising:

monitoring messages in the network;

using second information from the messages to determine whether there are changes to the health of the virtual router; and updating, if there are changes in the health of the virtual router, the topology to reflect the changes in the health of the virtual router.

21. The method of claim 19, comprising:

obtaining the first information from a routers of a plurality of virtual routers, wherein the topology identifies the health of the plurality of virtual routers.

22. The method of claim 19, wherein the first information is group priority information and group standby state information for each of the first and second routers.

23. The method of claim 19, wherein the first and second routers operate according to a virtual swappable router protocol.

24. A computer readable medium containing a computer program for performing a method for a network management system to identify active and standby states of plural routers within a virtual router in a network, the method comprising:

obtaining first information from a first router and a second router in the network, the first information comprising group priority information and group standby state information;

determining, based on the first information, whether the first and second routers comprise a virtual router;

using the first information to determine the active and standby states within the virtual router if the first and second routers comprise a virtual router, the standby state designating a redundant router; and producing a topology of the network identifying the active and standby states to display the health of the virtual router at the network management system based on the obtained first information.

25. The method of claim 24, comprising:

monitoring messages in the network;

using second information from the messages to determine whether there are changes to the health of the virtual router; and updating, if there are changes in the health of the virtual router, the topology to reflect the changes in the health of the virtual router.

26. The method of claim 24, wherein the first information is group priority information and group standby state information for each of the first and second routers.

27. The method of claim 24, wherein the first and second routers operate according to a virtual swappable router protocol.

28. A management computer for identifying active and standby states of plural routers within a virtual router in a network comprising:

means for processing to obtain first information from a first router and a second router of a virtual router, and to use the first information to determine the active and standby states within the virtual router, the standby state designating a redundant router, the first information comprising group priority information and group standby state information; and means for storing the first information to produce a topology of the network identifying the active and standby states and display the health of the virtual router at the management computer based on the obtained first information.

29. The management computer of claim 28, wherein the means for processing monitors messages in the network, uses second information from the messages to determine whether there are changes to the health of the virtual router, and updates, if there are changes in the health of the virtual router, the topology to reflect the changes in the health of the virtual router.

30. The management computer of claim 28, wherein the means for processing obtains the first information from a router of a plurality of virtual routers, wherein the topology identifies the health of the plurality of virtual routers.

31. The management computer of claim 28, wherein the first information is group priority information and group standby state information for each of the first and second routers.

32. The management computer of claim 28, wherein the first and second routers operate according to a virtual swappable router protocol.

33. A management computer for identifying active and standby states of plural routers within a virtual router in a network comprising:

means for processing to obtain first information from a first router and a second router in the network, to determine, based on the first information, whether the first and second routers comprise a virtual router, to use the first information to determine the active and standby states within the virtual router if the first and second routers comprise a virtual router, the standby state designating a redundant router, the first information comprising group priority information and group standby state information; and means for storing the first information to produce a topology of the network identifying the active and standby states and display the health of the virtual router at the management computer based on the obtained first information.

34. The management computer of claim 33, wherein the means for processing monitors messages in the network, uses second information from the messages to determine whether there are changes to the health of the virtual router, and to updates, if there are changes in the health of the virtual router, the topology to reflect the changes in the health of the virtual router.

35. The management computer of claim 33, wherein the first information is group priority information and group standby state information for each of the first and second routers.

36. The management computer of claim 33, wherein the first and second routers operate according to a virtual swappable router protocol.

* * * * *